US009344167B2

(12) United States Patent
Gomadam et al.

(10) Patent No.: US 9,344,167 B2
(45) Date of Patent: May 17, 2016

(54) CODEBOOK SUBSAMPLING FOR MULTI-ANTENNA TRANSMIT PRECODER CODEBOOK

(71) Applicant: Broadcom Corporation, Irvine, CA (US)

(72) Inventors: Krishna Gomadam, San Jose, CA (US); Djordje Tujkovic, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 14/298,358

(22) Filed: Jun. 6, 2014

(65) Prior Publication Data

US 2014/0362941 A1 Dec. 11, 2014

Related U.S. Application Data

(60) Provisional application No. 61/831,951, filed on Jun. 6, 2013.

(51) Int. Cl.
| | |
|---|---|
| *H04B 7/02* | (2006.01) |
| *H04B 7/04* | (2006.01) |
| *H04B 7/06* | (2006.01) |

(52) U.S. Cl.
CPC ............ *H04B 7/0456* (2013.01); *H04B 7/0469* (2013.01); *H04B 7/063* (2013.01); *H04B 7/0617* (2013.01); *H04B 7/0626* (2013.01); *H04B 7/0647* (2013.01)

(58) Field of Classification Search
CPC ... H04L 1/0026; H04L 1/0027; H04L 1/0031; H04L 1/003; H04L 5/0053; H04B 7/0456; H04B 7/0469

USPC ................. 375/267, 299, 347, 219
See application file for complete search history.

(56) References Cited

U.S. PATENT DOCUMENTS

| | | | | |
|---|---|---|---|---|
| 8,160,125 | B2 * | 4/2012 | Clerckx et al. | 375/219 |
| 8,467,469 | B2 * | 6/2013 | Lee et al. | 375/267 |
| 8,976,884 | B2 * | 3/2015 | Krishnamurthy | H04B 7/0413 370/252 |
| 9,071,297 | B2 * | 6/2015 | Chen | H04B 7/0456 |
| 2011/0255625 | A1 * | 10/2011 | Song et al. | 375/267 |
| 2012/0314590 | A1 * | 12/2012 | Choudhury et al. | 370/252 |
| 2013/0070723 | A1 * | 3/2013 | Yie et al. | 370/329 |
| 2013/0083864 | A1 * | 4/2013 | Moulsley | 375/267 |
| 2013/0089078 | A1 * | 4/2013 | Liu et al. | 370/335 |
| 2013/0128833 | A1 * | 5/2013 | Lee et al. | 370/329 |
| 2013/0156125 | A1 * | 6/2013 | Ko et al. | 375/267 |
| 2013/0195035 | A1 * | 8/2013 | Taoka et al. | 370/329 |
| 2013/0223245 | A1 * | 8/2013 | Taoka et al. | 370/252 |
| 2013/0230007 | A1 * | 9/2013 | Nagata et al. | 370/329 |
| 2013/0315051 | A1 * | 11/2013 | Malladi et al. | 370/210 |
| 2014/0133317 | A1 * | 5/2014 | Chen et al. | 370/252 |

(Continued)

*Primary Examiner* — Emmanuel Bayard
(74) *Attorney, Agent, or Firm* — Sterne, Kessler, Goldstein & Fox P.L.L.C.

(57) ABSTRACT

Embodiments provide approaches for sub-sampling a two-component precoder codebook to reduce the overhead associated with signaling the codebook in periodic Channel State Information (CSI) reports from a user equipment (UE) to a base station. In one embodiment, a first component of the codebook is sub-sampled to accommodate a payload capacity of a Physical Uplink Control Channel (PUCCH) CSI Report of Type 1. In another embodiment, both the first component and the second component of the codebook are sub-sampled to accommodate a maximum payload capacity associated with a PUCCH CSI report.

20 Claims, 4 Drawing Sheets

(56) References Cited

U.S. PATENT DOCUMENTS

| | | | |
|---|---|---|---|
| 2014/0140281 A1* | 5/2014 | Choudhury et al. | 370/328 |
| 2014/0177745 A1* | 6/2014 | Krishnamurthy et al. | 375/267 |
| 2014/0254701 A1* | 9/2014 | Geirhofer et al. | 375/267 |
| 2014/0301496 A1* | 10/2014 | Ko et al. | 375/267 |
| 2014/0348075 A1* | 11/2014 | Kim et al. | 370/329 |

\* cited by examiner

CODEBOOK SUBSAMPLING FOR MULTI-ANTENNA TRANSMIT PRECODER CODEBOOK

CROSS-REFERENCE TO RELATED APPLICATION(S)

The present application claims the benefit of U.S. Provisional Application No. 61/831,951, filed Jun. 6, 2013, which is incorporated herein by reference in its entirety.

TECHNICAL FIELD

The present disclosure relates generally to multi-antenna transmit precoding, including codebook sub-sampling for multi-antenna transmit precoder codebook.

BACKGROUND

Background Art

Current cellular technology standards (e.g., Long Term Evolution (LTE)) support various multi-antenna transmit configurations, in which a user equipment (UE) can receive simultaneous transmissions from multiple transmit antennas of the network. This requires that the simultaneous transmissions be pre-coded with respective transmit precoders so as not to interfere with each other at the UE.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

For the purposes of this discussion, the term "processor circuitry" shall be understood to include one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal or external memory to retrieve instructions stored in the memory, which when executed by the processor, perform the corresponding function(s) associated with the processor.

In the following disclosure, terms defined by the Long-Term Evolution (LTE) standard are sometimes used. For example, the term "eNodeB" or "eNB" is used to refer to what is commonly described as base station (BS) or base transceiver station (BTS) in other standards. The term "User Equipment (UE)" is used to refer to what is commonly described as a mobile station (MS) or mobile terminal in other standards. However, as will be apparent to a person of skill in the art based on the teachings herein, embodiments are not limited to the LTE standard and can be applied to other wireless communication standards, including, without limitation, WiMAX, WCDMA, WLAN, and Bluetooth. As such, according to embodiments, an eNB in the disclosure herein can more generally be an Access Point (AP), where the AP encompasses APs (e.g., WLAN AP, Bluetooth AP, etc), base stations, or other network entities that terminate the air interface with the mobile terminal.

I. Example Environment

Figure 1:
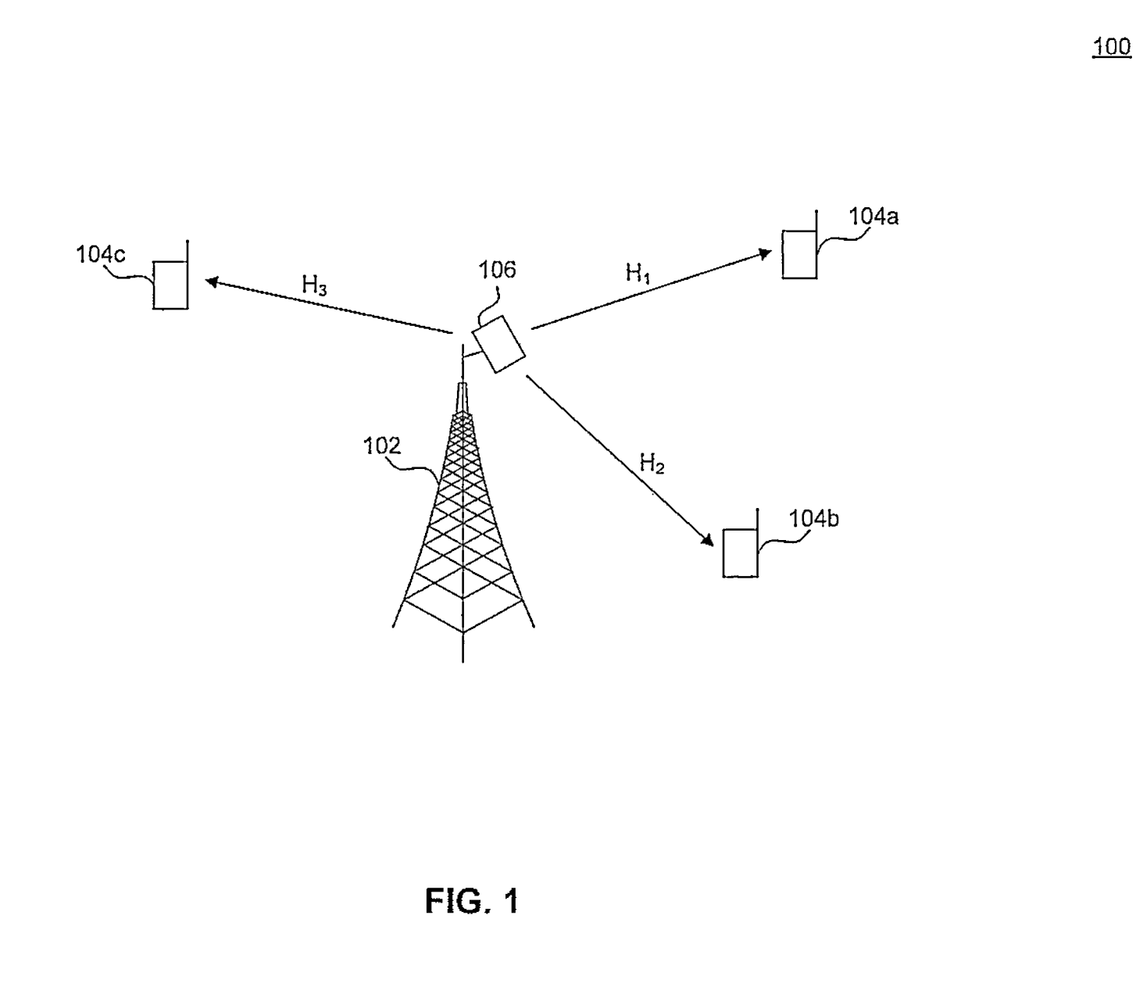
FIG. 1 illustrates an example environment in which embodiments can be implemented or practiced.

FIG. 1 illustrates an example environment 100 in which embodiments can be practiced or implemented. Example environment 100 is provided for the purpose of illustration only and is not limiting of embodiments. As shown in FIG. 1, example environment 100 includes, without limitation, a base station 102 and a plurality of user equipments (UEs) 104a, 104b, and 104c.

Base station 102 can be a cellular network base station, such as an LTE eNB, a WCDMA Node B, or a WiMAX base station, for example. Alternatively, base station 102 can be a wireless network access point (AP), such as a WLAN or a Bluetooth AP, for example. Base station 102 provides network access (voice, video, or data) to UEs 104a, 104b, and 104c.

In an embodiment, base station 102 includes an antenna array 106 that it uses to serve UEs in its vicinity, such as UEs 104a, 104b, and 104c. Antenna array 106 can include a plurality of antennas, each of which can be used for transmission or reception. In an embodiment, antenna array 106 is a massive Multiple Input Multiple Output (M-MIMO) antenna array that includes a significantly larger number of antennas than used in existing base station implementations (which can be up to 8 antenna elements). For example, M-MIMO antenna array 106 can have 16, 32, 64 or more antenna elements.

Figure 2:
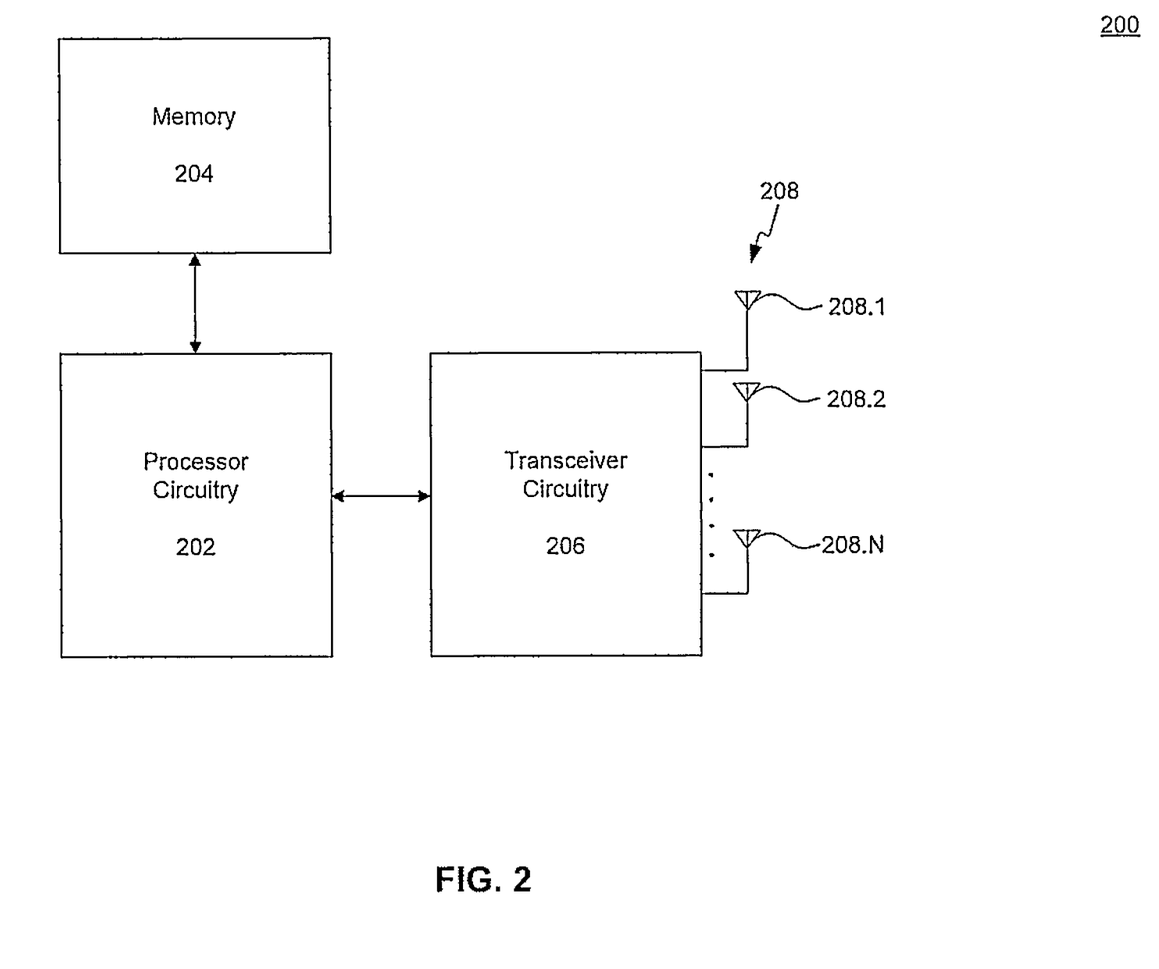
FIG. 2 illustrates an example communication device according to an embodiment.

In an embodiment, base station 102 or any one of UEs 104a, 104b, and 104c can be implemented as illustrated by example communication device 200 shown in FIG. 2. Example communication device 200 is provided for the purpose of illustration only and is not limiting of embodiments. As shown in FIG. 2, example communication device 200 includes, without limitation, a processor circuitry 202, a memory 204, a transceiver circuitry 206, and an antenna array 208 including a plurality of antenna elements 208.1, 208.2, ..., 208.N. Processor circuitry 202 can be implemented as described above and can be configured to perform the base station or UE functionalities described herein. In an embodiment, processor circuitry 202 executes logic instructions stored in memory 204 to perform the functionalities described herein. Transceiver circuitry 206 includes digital and/or analog circuitry that perform transmit and receive radio frequency (RF) processing, including filtering, power amplification, frequency up-conversion, frequency down-conversion, etc. Together with antenna array 208, transceiver circuitry 206 enables transmitting and receiving signals by communication device 200. In an embodiment, transceiver circuitry 206 and/or antenna array 208 can be controlled by processor circuitry 202 to transmit/receive at specified time-frequency resources (physical resource elements).

Returning to FIG. 1, in an embodiment, base station 102 can use antenna array 106 to beamform transmissions to UEs 104a, 104b, and 104c. In Single User MIMO (SU-MIMO), base station 102 can beamform one or more data streams (also referred to as "layers") to a single UE in a transmission that occupies a given time and frequency (physical) resource. In Multi-User MIMO (MU-MIMO), base station 102 can beamform two or more data streams to two or more UEs in a transmission that occupies a given physical resource.

In an embodiment, in order to beamform a transmission to one or more of UEs 104a, 104b, and 104c, base station 102 estimates the downlink channel(s) to UEs 104a, 104b, and/or 104c. The downlink channels to UEs 104a, 104b, and 104c are represented by $H_1$, $H_2$, and $H_3$ respectively in FIG. 1. In a TDD (Time Division Duplexing) mode embodiment (where downlink and uplink transmissions are time-multiplexed on the same frequency band), base station 102 can estimate the downlink channels to UEs 104a, 104b, and 104c based on respective estimates of the uplink channels from UEs 104a, 104b, and 104c to base station 102. Estimates of the uplink channels can be determined based on Sounding Reference Signals (SRS) and/or uplink Demodulation Reference Signals (DMRS) transmitted by UEs 104a, 104b, and 104c to base station 102.

In an FDD (Frequency Division Multiplexing) mode embodiment (where downlink and uplink transmissions can occur simultaneously on different frequency bands), base station 102 can acquire knowledge about the downlink channels to UEs 104a, 104b, and 104c based on Channel State Information (CSI) reported by UEs 104a, 104b, and 104c. The CSI reported by a UE can include a Rank Index (RI) (which indicates a preferred number of data streams), a Precoding Matrix Indicator (PMI) (which is an index that identifies a preferred precoder matrix from a pre-determined precoder codebook), and a Channel Quality Indicator (CQI) (which is an index that identifies an estimated channel quality corresponding to the reported RI and PMI). Generally, the RI, PMI, and CQI are determined by the UE based on a UE-side estimate of the downlink channel to the UE, which can be computed by the UE using downlink reference signals transmitted by the base station.

After acquiring downlink channel knowledge, base station 102 determines a precoding matrix (the precoding matrix reduces to a vector when a single data stream is being beamformed) based on the downlink channel estimate(s) and/or the PMIs signaled by the UEs, and multiplies the data stream(s) by the precoding matrix to generate pre-coded signals. The pre-coded signals are then forwarded (after appropriate processing, including physical resource mapping and radio frequency processing) to antenna array 106 for transmission. In an embodiment, each of the pre-coded signals is coupled to a respective antenna of antenna array 106 for transmission.

In an embodiment, the precoding matrix is composed of precoder vector(s) (a column vector of the precoding matrix may correspond a precoder vector) and/or precoder matrix(ces) (a set of column vectors of the precoding matrix may correspond to a precoder matrix), with each precoder vector or matrix corresponding to a respective UE included (with one or more data stream) in the transmission. The precoder vector(s) and/or precoder matrix(ces) of the precoding matrix each corresponds to a precoder codeword selected from a pre-determined precoder codebook. For example, a first precoder vector of the precoding matrix (e.g., the first column vector of the precoding matrix) may correspond to a rank 1 precoder codeword for beamforming a single data stream to UE 104a, selected from a pre-determined rank 1 precoder codebook. A second and a third precoder vector (e.g., second and third column vectors of the precoding matrix, which together form a precoder matrix) of the precoding matrix may correspond to a rank 2 precoder codeword for beamforming two data streams to UE 104b, selected from a pre-determined rank 2 precoder codebook. For simplification, hereinafter, the term "precoder matrix" is used to refer to both a precoder vector (i.e., a rank 1 precoder codeword) and a precoder matrix (i.e., a rank 2 or higher precoder codeword).

The precoder codeword selected by base station 102 for a given data stream is typically based at least in part on the downlink channel to the UE for which the data stream is intended. For example, the precoder codeword may be the same as or based on the PMI signaled by the UE to base station 102. To allow the UE to properly demodulate a beamformed data stream, base station 102 indicates the precoder codeword applied to the data stream to the UE. In an embodiment, base station 102 signals to the UE on a control channel an index (PMI) that identifies the used precoder codeword from within the precoder codebook. As conditions of the downlink channel to the UE change, base station 102 may vary the precoder codeword applied to the data stream. In an embodiment, base station 102 periodically signals the PMI to the UE on the control channel.

II. Two-Component Precoder Codebook

The efficiency of beamforming from base station 102 to UEs 104a, 104b, and 104c depends on the ability of base station 102 to acquire good estimates of the downlink channels to UEs 104a, 104b, and 104c. But even if base station 102 had complete, accurate, and current knowledge of the downlink channels to UEs 104a, 104b, and 104c, beamforming efficiency can still be sub-optimal if the precoder codebook did not provide a sufficiently granular quantization of the precoder vector space.

To remedy this problem without using a very fine resolution precoder codebook (which results in large signaling overhead), the LTE standard adopted a two-component precoder codebook. According to this approach, the precoder codeword is obtained (at the base station or the UE) from a first component (W1) signaled at a first time and a second component (W2) signaled at a subsequent second time.

Figure 3:
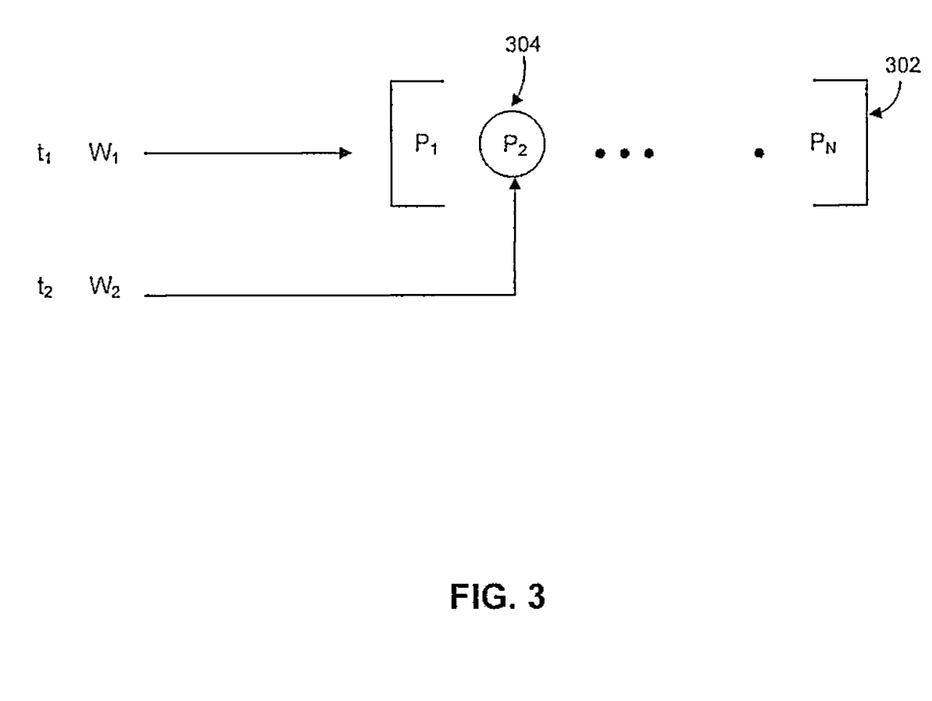
FIG. 3 illustrates the signaling of a precoder codeword from a two-component codebook.

FIG. 3 illustrates the signaling of a precoder codeword from a two-component codebook. As shown, at a first time t1, the first component W1 is signaled to identify a codebook subset 302, including a plurality of precoder codewords, to the receiver. Subsequently, at a second time t2, the second component W2 is signaled, which allows the receiver to identify a single precoder codeword, e.g., 304, from the codebook subset 302. In an embodiment, W1 and W2 are signaled at different periodic rates, e.g., W1 is signaled at a lower rate than W2. The resulting precoder codeword would thus be limited to within codebook sub-set 302 until a new W1 is signaled.

A two-component precoder codebook can be designed and used with various transmit antenna configurations. For example, a two-component precoder codebook can be used for a common transmit antenna configuration, known as Closely Spaced Cross Polarized Antenna Array (C-XPOL). In the C-XPOL antenna configuration, a precoder vector (for a 4 transmit antenna configuration) of the precoding matrix is of the form:

$$v_{XPOL}(\theta, c) = \begin{bmatrix} 1 \\ e^{-j\theta} \\ c \\ ce^{-j\theta} \end{bmatrix} \quad (1)$$

where θ denotes a phase difference due to physical separation (separation phase difference) between antennas of the antenna array and c denotes a phase difference due to cross-polarization (cross-polarization phase difference) of the antennas.

In an embodiment, for a C-XPOL antenna configuration, the first component W1 is configured to encompass a long term (in time) or a wideband (in frequency) variation of the separation phase difference θ. The second component W2 is configured to describe the cross-polarization phase difference c and a short term (in time) or a narrowband (in frequency) variation of the separation phase difference θ.

The LTE-Advanced standard is expected to support enhanced two-component codebooks for a 4Tx antenna configuration (where the transmitter or base station transmits using 4 transmit antennas) and an 8Tx antenna configuration (where transmitter or base station transmits using 8 transmit antennas). The codebooks are provided for a UE rank between 1 and 4. For the purpose of illustration, the rank 1 codebook and one of the options for the rank 2 codebook are described below for the 4Tx antenna configuration case. Hereinafter, these codebooks are referred to as the original LTE precoder codebooks.

For both rank 1 and rank 2 codebooks, the first component W1 of a precoder codeword is selected from:

$$W_1 = \begin{bmatrix} X_n & 0 \\ 0 & X_n \end{bmatrix} \quad (2)$$

where n=0, 1 ..., 15, and where $$X_n = \begin{bmatrix} 1 & 1 & 1 & 1 \\ q_1^n & q_1^{n+8} & q_1^{n+16} & q_1^{n+24} \end{bmatrix} \quad (3)$$

and $q_1 = e^{j2\pi/32}$. This provides 16 options for the first component W1, each of which can be signaled using 4 bits.

For rank 1, the second component W2 of the precoder codeword is selected from:

$$W_{2n} \in \quad (4)$$
$$\left\{ \frac{1}{\sqrt{2}} \begin{bmatrix} Y \\ \alpha(i)Y \end{bmatrix}, \frac{1}{\sqrt{2}} \begin{bmatrix} Y \\ j\alpha(i)Y \end{bmatrix}, \frac{1}{\sqrt{2}} \begin{bmatrix} Y \\ -\alpha(i)Y \end{bmatrix}, \frac{1}{\sqrt{2}} \begin{bmatrix} Y \\ -j\alpha(i)Y \end{bmatrix} \right\}$$

where $Y \in \{e_1, e_2, e_3, e_4\}$ and $\alpha(i) = q_1^{2(i-1)}$. This gives 16 options for the second component W2, each of which jointly encodes a column selection choice given by Y for selecting one of the four columns of $X_n$ for creating the precoder codeword, and a precoder structure (from four different structures given by $W_{2,n}$) for the precoder codeword.

For rank 2, the second component W2 can be selected from:

$$W_{2,n} \in \left\{ \frac{1}{2}\begin{bmatrix} Y_1 & Y_2 \\ Y_1 & Y_2 \end{bmatrix}, \frac{1}{2}\begin{bmatrix} Y_1 & Y_2 \\ Y_1 & -Y_2 \end{bmatrix}, \frac{1}{2}\begin{bmatrix} Y_1 & Y_2 \\ -Y_1 & Y_2 \end{bmatrix}, \frac{1}{2}\begin{bmatrix} Y_1 & Y_2 \\ -Y_1 & -Y_2 \end{bmatrix} \right\} \quad (5)$$
$$(Y_1, Y_2) \in \{(e_2, e_4)\}$$

and $$W_{2,n} \in \left\{ \frac{1}{2}\begin{bmatrix} Y_1 & Y_2 \\ Y_1 & -Y_2 \end{bmatrix}, \right. \quad (6)$$
$$\left. \frac{1}{2}\begin{bmatrix} Y_1 & Y_2 \\ jY_1 & -jY_2 \end{bmatrix} (Y_1, Y_2) \in \{(e_1, e_1), (e_2, e_2), (e_3, e_3), (e_4, e_4)\} \right\}$$

and $$W_{2,n} \in \left\{ \frac{1}{2}\begin{bmatrix} Y_1 & Y_2 \\ Y_2 & -Y_1 \end{bmatrix}, \right\} (Y_1, Y_2) \in \{(e_1, e_3), (e_2, e_4), (e_3, e_1), (e_4, e_2)\}. \quad (7)$$

Here, the second component W2 also encodes a structure for the precoder codeword and, in the case that the structure is from the second and third structure sets, W2 also encodes a column selection choice given by (Y1, Y2).

III. CSI Reporting in LTE

The LTE standard specifies two types of CSI reports, aperiodic and periodic. Aperiodic CSI reports are delivered by the UE when explicitly requested by the network and are transmitted on a dynamically assigned resource of the Physical Uplink Shared Channel (PUSCH). Periodic CSI reports are configured by the network to be delivered with a certain periodicity, on a semi-statically configured Physical Uplink Control Channel (PUCCH) resource. Generally, aperiodic reports contain more detail than periodic reports because the PUSCH is capable of a larger payload than the PUCCH.

Because of the limited payload of PUCCH, periodic CSI reports can vary in terms of content. For example, in some periodic CSI modes, the RI, PMI, and CQI are transmitted at different time instants in different CSI reports. Table 1 below illustrates the contents of CSI reports according to the PUCCH 1-1, sub-mode 1 and the PUCCH 1-1, sub-mode 2 reporting modes:

TABLE 1

| PUCCH Mode | Report Type 1 | Report Type 2 |
|---|---|---|
| PUCCH 1-1, sub-mode 1 | RI, W1 | CQI, W2 |
| PUCCH 1-1, sub-mode 2 | RI | CQI, W1, W2 |

As shown in Table 1, in PUCCH 1-1, sub-mode 1, RI and the first component W1 (of the precoder codeword) are signaled in a first CSI report (CSI report Type 1) and the CQI and the second component W2 are signaled in a second CSI report (CSI report Type 2). RI and W1 are jointly encoded in the CSI report Type 1. In PUCCH 1-1, sub-mode 2, RI is signaled in a CSI report Type 1 and CQI, W1, and W2 are signaled in a CSI report Type 2.

IV. Codebook Sub-Sampling for Periodic CSI

The LTE codebooks described above in section II place lower limits on the signaling bits necessary to signal the first component W1 and the second component W2 of a precoder codeword. This is summarized in Table 2 below for a UE rank between 1 and 4.

TABLE 2

| Rank | (W1, W2) bits |
|---|---|
| 1 | (4, 4) |
| 2 | (4, 4) |
| 3 | (0, 4) |
| 4 | (0, 4) |

These limits however can cause certain periodic CSI reports to exceed the payload capacity of PUCCH in certain CSI modes. For example, for PUCCH 1-1, sub-mode 1, the payload capacity of a CSI report Type 1 is limited to only 5 bits as it is configured to carry the long term component W1. But with 4 bits required for W1 (for rank 1 and 2) per Table 2 and 2 bits for RI, the resulting CSI report would exceed the CSI report Type 1 payload capacity. Similarly, for PUCCH 1-1, sub-mode 2, a CSI report Type 2 (for rank 1 and 2) would require a minimum of 13 bits (5 for CQI and 8 for W1 and W2), two more than the 11-bit maximum payload capacity of any PUCCH CSI report.

Embodiments, as further described below, provide approaches for sub-sampling a two-component precoder codebook to reduce the overhead associated with signaling the codebook in periodic CSI reports from a UE to a base station. In one embodiment, suitable for PUCCH 1-1, sub-mode 1, the first component W1 of the codebook is sub-sampled to accommodate the payload capacity of a CSI report Type 1. In another embodiment, suitable for PUCCH 1-1, sub-mode 2, both the first component W1 and the second component W2 are sub-sampled to accommodate a maximum payload capacity associated with PUCCH CSI reports.

a) PUCCH 1-1, Sub-Mode 1

For PUCCH 1-1, sub-mode 1, in an embodiment, the first component W1 is sub-sampled to accommodate the payload capacity of a CSI report Type 1. As described above, in a CSI report type 1, RI and W1 are jointly encoded so that a signaled bit sequence jointly identifies the RI and W1. Tables 3 and 4 below describe example allocations of the number of W1s per rank according to two embodiments. The first embodiment illustrated in Table 3 assumes that RI and W1 are jointly encoded using 4 bits. The second embodiment illustrated in Table 4 assumes that RI and W1 are jointly encoded using 5 bits.

Table 3 provides three example options for allocating the 16 states (bit combinations) available in a 4-bit joint encoding of W1 and RI. For example, in Option 1, 8 states are allocated for signaling W1 for rank 1, 6 states are allocated for signaling W1 for rank 2, one state is allocated for signaling W1 and rank 3, and one state is allocated for signaling W1 for rank 4. Note that for rank 3 and rank 4, W1 can have one value (identity matrix). Therefore, the allocated state is used to signal the rank, from which the W1 can be inferred.

TABLE 3

| Rank | 4 bits $W_1$ + RI: Option 1 Number of W1s per rank | 4 bits $W_1$ + RI: Option 2 Number of W1s per rank | 4 bits $W_1$ + RI: Option 3 Number of W1s per rank |
|---|---|---|---|
| 1 | 8 {0, 2, 4, 6, 8, 10, 12, 14} | 8 {0, 2, 4, 6, 8, 10, 12, 14} | 7 {0, 2, 4, 6, 8, 10, 12} |
| 2 | 6 {0, 2, 4, 6, 8, 10} | 4 {0, 4, 8, 12} | 7 {0, 2, 4, 6, 8, 10, 12} |
| 3 | 1 | 1 | 1 |
| 4 | 1 | 1 | 1 |

Because the number of states allocated for signaling W1 for ranks 1 and 2 is lower than the total possible number of W1 states (16 states as described above), W1 is sub-sampled as shown in Table 3. For example, in Option 1, the W1 space is sub-sampled to the 8 states corresponding to n={0, 2, 4, 6, 8, 10, 12, and 14} (from equation (2) above) for rank 1, and to the 6 states corresponding to n={0, 2, 4, 6, 8, and 10} for rank 2.

In an embodiment, the sub-sampled spaces of Option 1 are configured to span the full range of the cross-polarization phase difference values of the transmit antennas. For example, the 8 states corresponding to n={0, 2, 4, 6, 8, 10, 12, and 14} provide every possible value of the cross-polarization phase difference c. In contrast, these states sub-sample the possible values of the separation phase difference θ. The rationale behind this selection is that given that a PUCCH reported PMI is a wideband PMI (used for the entire bandwidth) and that the separation phase difference θ varies slowly across the entire bandwidth, a sub-sampled W1 space that provides greater resolution for the cross-polarization phase difference c at the expense of a lower resolution for the separation phase difference θ results in a better precoding performance.

Table 4 provides three example options for allocating the 32 states available in a 5-bit joint encoding of W1 and RI. For example, in Option 1, 16 states are allocated for signaling W1 for rank 1, 14 states are allocated for signaling W1 for rank 2, one state is allocated for signaling W1 for rank 3, and one state is allocated for signaling W1 for rank 4. Note that for rank 3 and rank 4, W1 can have one value (identity matrix). Therefore, the allocated state is used to signal the rank, from which the W1 can be inferred.

TABLE 4

| Rank | 5 bit RI + $W_1$: Option 1 Number of W1s per rank | 5 bit RI + $W_1$: Option 2 Number of W1s per rank | 5 bit RI + $W_1$: Option 3 Number of W1s per rank |
|---|---|---|---|
| 1 | 16 No subsampling | 16 No subsampling | 15 {0, ... 14} |
| 2 | 14 {0, ... 13} | 8 {0, 2, 4, 6, 8, 10, 12, 14} | 15 {0, ... 14} |
| 3 | 1 | 1 | 1 |
| 4 | 1 | 1 | 1 |

Note that for Options 1 and 2, no sub-sampling is required for rank 1 with 16 states being allocated for that rank. For Option 2, similar sub-sampling is used for rank 2 as used for rank 1 in Option 1 of the 4-bit joint encoding case described in Table 3 above.

b) PUCCH 1-1, Sub-Mode 2

For PUCCH 1-1, sub-mode 2, in an embodiment, both the first component W1 and the second component W2 are sub-sampled to accommodate a maximum payload capacity associated with a PUCCH CSI report. Because in sub-mode 2, W1 and W2 are signaled in CSI report Type 2 along with the CQI, in an embodiment, W1 and W2 are jointly encoded and signaled using 4 bits as illustrated in Table 5 below.

TABLE 5

| Rank | W1 indices | W2 indices |
| --- | --- | --- |
| 1 | {0, 4, 8, 12} | {0, 2, 8, 10} |
| 2 | {0, 4, 8, 12} | As per Eqn (8) |

According to this joint encoding, W1 and W2 can each have four states, for a total of 16 joint states. In an embodiment, for rank 1, the W1 space is sub-sampled to the 4 states corresponding to n={0, 4, 8, and 12} (from equation (2) above), and the W2 space is sub-sampled to the 4 states given by the indices {0, 2, 8, and 10} (from equation (4) above). For rank 2, the same W1 subsampling is used, and the W2 is sub-sampled to result in the 4 W2 states given by equation (8) below:

$$W_{2,n} \in \left\{ \frac{1}{2}\begin{bmatrix} Y_1 & Y_2 \\ Y_1 & -Y_2 \end{bmatrix} \right\} (Y_1, Y_2) \in \{(e_1, e_1), (e_2, e_2), (e_3, e_3), (e_4, e_4)\} \quad (8)$$

Embodiments described above are most suited for C-XPOL antenna configurations. Another common antenna configuration is the Uniform Linear Array (ULA) antenna configuration. An example ULA-friendly sub-sampling for PUCCH 1-1, sub-mode 2 is described below.

In the ULA antenna configuration, a precoder vector (for 4Tx antenna configuration) of the precoding matrix is of the form:

$$V_{ULA}(\theta) = \begin{bmatrix} 1 \\ e^{-j\theta} \\ e^{-j2\theta} \\ e^{-j3\theta} \end{bmatrix} \quad (9)$$

where $\theta$ denotes a phase difference due to physical separation (separation phase difference) between antennas of the array. This precoder form is referred to as a Discrete Fourier Transform (DFT) vector because it has the same progression as the terms of a DFT.

In the original LTE precoder codebook, the separation phase difference $\theta$ (also referred to as the "DFT angle") from 0 to $2\pi$ is quantized into 32 (from 0 to 31) discrete values. For each selection index (e1, e2, e3, and e4), the effective precoder codeword is a combination of a half DFT vector (first half of the DFT vector) and the cross-polarization phase difference as given in Table 6 below.

TABLE 6

| Selection | Half DFT Angles | Cross-Polarization Phase Angle |
| --- | --- | --- |
| 1 | {0:15} | {0, 8, 16, 24} |
| 2 | {8:23} | {0, 8, 16, 24} + 2 |
| 3 | {16:31} | {0, 8, 16, 24} + 4 |
| 4 | {24:31, 0:7} | {0, 8, 16, 24} + 6 |

Not all precoders in the original LTE precoder codebook are DFT vectors. But a DFT vector is obtained when the cross-polarization phase angle is twice the half DFT angle.

Based on this property, for any $W_1$ index, DFT vectors are obtained in the original LTE precoder codebook for the cases shown in Table 7 below.

TABLE 7

| W1 index | E1 Phase Index | E2 Phase Index | E3 Phase Index | E4 Phase Index |
| --- | --- | --- | --- | --- |
| 0 | 0 | | | |
| 1 | | 0 | | |
| 2 | | | 0 | |
| 3 | | | | 0 |
| 4 | 1 | | | |
| 5 | | 1 | | |
| 6 | | | 1 | |
| 7 | | | | 1 |
| 8 | 2 | | | |
| 9 | | 2 | | |
| 10 | | | 2 | |
| 11 | | | | 2 |
| 12 | 3 | | | |
| 13 | | 3 | | |
| 14 | | | 3 | |
| 15 | | | | 3 |

For example, for n=0 (W1 index), a full DFT vector is obtained when the first selection index e1 is chosen and when the cross-polarization phase angle index is 0 (which corresponds to the value 1). For n=4, a full DFT vector is obtained when the first selection index e1 is chosen and when the cross-polarization phase angle index is 1 (which corresponds to j).

The DFT vectors illustrated in Table 7 correspond to the precoders with the indices {0,3,4,7,8,9,12,13,17,18,21,22,26,27,30,31} in the original LTE precoder codebook. In an embodiment, the original LTE precoder codebook is sub-sampled to result in at least 8 DFT vectors (with almost uniform quantization). In one embodiment, the sub-sampled precoder codebook includes the precoders with the indices {0, 4, 8, 12, 17, 21, 26, and 30}. W1 and W2 are accordingly jointly encoded in CSI report Type 2 using 3 bits to signal a precoder from this sub-sampled precoder codebook.

Figure 4:
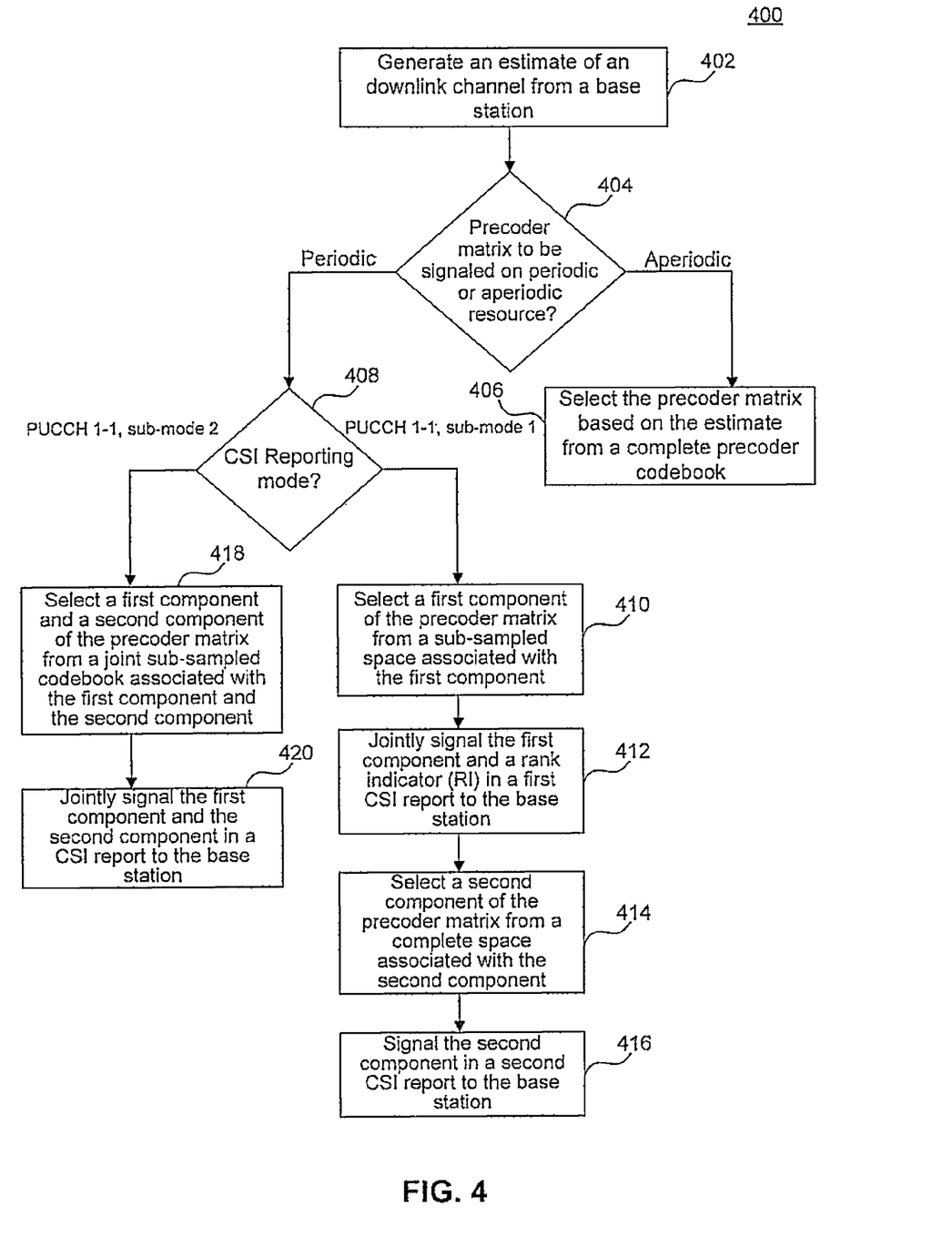
FIG. 4 is an example process according to an embodiment.

FIG. 4 illustrates an example process 400 according to an embodiment. Example process 400 is provided for the purpose of illustration only and is not limiting of embodiments. Example process 400 can be performed by a UE, such as one of UEs 104a-c described above in FIG. 1 to signal a precoder matrix to a base station, where the precoder matrix is from a two-component precoder codebook having a first component and a second component. Steps of process 400 can be performed by a processor circuitry, such as processor circuitry 202 described above in FIG. 2.

As shown in FIG. 4, process 400 begins in step 402, which includes generating an estimate of a downlink channel from the base station. In an embodiment, the UE is configured with a CSI process by the base station, which allows the UE to measure downlink reference signals on specific physical resources and to estimate the downlink channel from the base station based on the downlink reference signals. Based on the downlink channel estimate, the UE determines a precoder matrix identified by a PMI, a CQI, and a RI for signaling in a CSI report to the base station. In an embodiment, the precoder matrix corresponds to a precoder codeword from the two-component precoder codebook.

Subsequently, step 404 includes determining whether the precoder matrix (or more specifically the PMI identifying the precoder matrix) is to be signaled to the base station on a periodic or an aperiodic resource. In an embodiment, the aperiodic uplink resource corresponds to a PUSCH resource, and the aperiodic resource corresponds to a PUCCH resource. For example, step 404 can include determining whether the precoder matrix is being signaled in an aperiodic CSI report triggered by downlink signaling from the base station to the UE, or in a semi-statically configured periodic CSI report.

If the precoder matrix is to be signaled on an aperiodic resource, process 400 proceeds to step 406, which includes selecting the precoder matrix, based on the estimate of the downlink channel, from a first precoder codebook. In an embodiment, the first precoder codebook corresponds to a complete (not sub-sampled) precoder codebook. For example, the first precoder codebook can be the original LTE precoder codebook described in equations (2) through (7) above.

Otherwise, if the precoder matrix is to be signaled on a periodic resource, then the precoder matrix is selected, based on the estimate, from a second precoder codebook as further described below with respect to steps 410 through 416 or 418-420. In an embodiment, the second precoder codebook is a sub-sampled version of the first precoder codebook, which can be obtained by sub-sampling one or both of the first and second components of the pre-coder codebook.

Specifically, if the precoder matrix is to be signaled on a periodic resource, process 400 proceeds to step 408. Step 408 includes determining the CSI reporting mode of the UE. Typically, the UE is pre-configured with a periodic CSI reporting mode. As described above, this can include PUCCH 1-1, sub-mode 1, PUCCH 1-1, sub-mode 2, etc.

If the CSI reporting mode of the UE is PUCCH 1-1, sub-mode 1, process 400 proceeds to step 410, which includes selecting the first component of the precoder matrix from a sub-sampled space associated with the first component (the sub-sampled space includes only a portion of the full space associated with the first component). In an embodiment, the sub-sampled space is configured to span a full range of a cross-polarization phase difference associated with transmit antennas of the base station.

Subsequently, step 412 includes jointly signaling the first component and a RI in a first CSI report to the base station. In an embodiment, the first CSI report is a PUCCH 1-1, sub-mode 1 CSI report Type 1.

Next, step 414 includes selecting the second component of the precoder matrix from a complete space associated with the second component, and step 416 includes signaling the second component in a second CSI report to the base station. In an embodiment, the second CSI report corresponds to a PUCCH 1-1, sub-mode 1 CSI report Type 2. As would be understood by a person of skill in the art based on the teachings herein, steps 412 and 414 can be performed in a different order than shown in FIG. 4 in other embodiments.

Returning to step 408, if the CSI reporting mode of the UE is PUCCH 1-1, sub-mode 2, process 400 proceeds to step 418, which includes selecting the first component and the second component of the precoder matrix from a joint sub-sampled codebook associated with the first component and the second component. The joint sub-sampled codebook jointly encodes a sub-sampled space of the first component and a sub-sampled space of the second component.

Process 400 then proceeds to step 420, which includes jointly signaling the first component and the second component in a CSI report to the base station. In an embodiment, the CSI report corresponds to a PUCCH 1-1, sub-mode 2 CSI report Type 2.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A User Equipment (UE), comprising:
processor circuitry configured to:
generate an estimate of a downlink channel from a base station;
select a precoder matrix, based on the estimate, from a first precoder codebook when the precoder matrix is for signaling on an aperiodic uplink resource; and
select a first component and a second component of the precoder matrix, based on the estimate, from a second precoder codebook when the precoder matrix is for signaling on a periodic uplink resource, wherein the second precoder codebook is a joint sub-sampled codebook that is a sub-sampled version of the first precoder codebook; and
transceiver circuitry configured to transmit the precoder matrix to the base station.

2. The UE of claim 1, wherein the aperiodic uplink resource is a Physical Uplink Shared Channel (PUSCH) resource, and the periodic resource is a Physical Uplink Control Channel (PUCCH) resource.

3. The UE of claim 1, wherein the processor circuitry is further configured to jointly signal the first component and the second component in a Physical Uplink Control Channel (PUCCH) 1-1, sub-mode 2 Channel State Information (CSI) report to the base station.

4. The UE of claim 1, wherein the joint sub-sampled codebook includes 16 entries.

5. The UE of claim 1, wherein when the precoder matrix is selected for signaling on the periodic uplink resource, the processor circuitry is further configured to: select the precoder matrix from a sub-sampled codebook composed of Discrete Fourier Transform (DFT) form precoder matrices of the first precoder codebook.

6. The UE of claim 1, wherein selecting the precoder matrix for signaling on the aperiodic uplink resource comprises selecting the precoder matrix, based on the estimate, from a complete precoder codebook.

7. A User Equipment (UE), comprising:
processor circuitry configured to:
generate an estimate of a downlink channel from a base station;

select a precoder matrix, based on the estimate, from a first precoder codebook when the precoder matrix is for signaling on an aperiodic uplink resource;

select the precoder matrix, based on the estimate, from a second precoder codebook when the precoder matrix is for signaling on a periodic uplink resource; and transceiver circuitry configured to transmit the precoder matrix to the base station;

wherein when the precoder matrix is selected for signaling on the periodic uplink resource, the processor circuitry is further configured to:

select a first component of the precoder matrix from a sub-sampled space associated with the first component, and select a second component of the precoder matrix from a complete space associated with the second component; and jointly signal the first component and a rank indicator (RI) in a Physical Uplink Control Channel (PUCCH) 1-1, sub-mode 1 Channel State Information (CSI) report to the base station, wherein the joint signaling of the first component and the RI includes a same set of bits that represents both the first component and the RI.

8. The UE of claim 7, wherein a payload of the PUCCH 1-1, sub-mode 1 CSI report is 4 or 5 bits long.

9. The UE of claim 7, wherein the sub-sampled space associated with the first component is configured to span a full range of a cross-polarization phase difference associated with transmit antennas of the base station.

10. The UE of claim 7, wherein the aperiodic uplink resource is a Physical Uplink Shared Channel (PUSCH) resource, and the periodic resource is a Physical Uplink Control Channel (PUCCH) resource.

11. The UE of claim 7, wherein selecting the precoder matrix for signaling on the aperiodic uplink resource comprises selecting the precoder matrix, based on the estimate, from a complete precoder codebook.

12. The UE of claim 7, wherein the processor circuitry is further configured to signal the second component in a second CSI report to the base station.

13. A method, comprising:
generating an estimate of a downlink channel from a base station;
selecting a precoder matrix, based on the estimate, from a first precoder codebook when the precoder matrix is for signaling on an aperiodic uplink resource;
selecting a first component and a second component of the precoder matrix, based on the estimate, from a second precoder codebook when the precoder matrix is for signaling on a periodic uplink resource, wherein the second precoder codebook is a joint sub-sampled codebook that is a sub-sampled version of the first precoder codebook; and
transmitting the precoder matrix to the base station.

14. The method of claim 13, wherein the aperiodic uplink resource is a Physical Uplink Shared Channel (PUSCH) resource, and the periodic resource is a Physical Uplink Control Channel (PUCCH) resource.

15. The method of claim 13, further comprising:
jointly signaling the first component and the second component in a Physical Uplink Control Channel (PUCCH) 1-1, sub-mode 2 Channel State Information (CSI) report to the base station.

16. The method of claim 13, wherein the joint sub-sampled codebook includes 16 entries.

17. A method, comprising:
generating an estimate of a downlink channel from a base station;
selecting a precoder matrix, based on the estimate, from a first precoder codebook when the precoder matrix is for signaling on an aperiodic uplink resource;
selecting the precoder matrix, based on the estimate, from a second precoder codebook when the precoder matrix is for signaling on a periodic uplink resource; and
transmitting the precoder matrix to the base station;
wherein when the precoder matrix is selected for signaling on the periodic uplink resource, the method further comprising:
selecting a first component of the precoder matrix from a sub-sampled space associated with the first component, and selecting a second component of the precoder matrix from a complete space associated with the second component; and
jointly signaling the first component and a rank indicator (RI) in a Physical Uplink Control Channel (PUCCH) 1-1, sub-mode 1 Channel State Information (CSI) report to the base station, wherein the jointly signaling of the first component and the RI includes a same set of bits that represents both the first component and the RI.

18. The method of claim 17, wherein the sub-sampled space associated with the first component is configured to span a full range of a cross-polarization phase difference associated with transmit antennas of the base station.

19. The method of claim 17, wherein the aperiodic uplink resource is a Physical Uplink Shared Channel (PUSCH) resource, and the periodic resource is a Physical Uplink Control Channel (PUCCH) resource.

20. The method of claim 17, further comprising signaling the second component in a second CSI report to the base station.

* * * * *